United States Patent
> Elliott, Jr. et al.

[15] 3,639,272

[45] Feb. 1, 1972

[54] PREPARATION OF HYDROGENATION CATALYSTS

[72] Inventors: George E. Elliott, Jr.; Jean Salomon, both of Oakmont; Roger F. Vogel, Pittsburgh, all of Pa.

[73] Assignee: Gulf Research & Development Company, Pittsburgh, Pa.

[22] Filed: July 1, 1969

[21] Appl. No.: 838,334

[52] U.S. Cl. ...........................252/442, 252/455 R, 252/458, 252/459
[51] Int. Cl. ....................................B01j 11/78, B01j 11/40
[58] Field of Search......................252/442, 455 R, 458, 459

[56] References Cited

UNITED STATES PATENTS

| | | | |
|---|---|---|---|
| 2,703,789 | 3/1955 | McKinley et al. | 252/455 |
| 2,918,510 | 12/1959 | Carr et al. | 252/458 X |
| 3,301,793 | 1/1967 | Adams et al. | 252/442 X |
| 3,409,562 | 11/1968 | Bridge | 252/458 X |

*Primary Examiner*—Daniel E. Wyman
*Assistant Examiner*—C. F. Dees
*Attorney*—Meyer Neishloss, Deane E. Keith and Donald L. Rose

[57] ABSTRACT

A method of preparing supported nickel-tungsten and nickel-tungsten-fluorine catalysts of superior hydrogenating activity, by separately impregnating and calcining a porous support material with a water-soluble tungsten salt and a solution of a nickel salt in which the support is washed following impregnation with the nickel salt prior to calcination to fix the nickel.

10 Claims, No Drawings

PREPARATION OF HYDROGENATION CATALYSTS

This invention relates to a novel method of preparing catalysts, particularly supported catalysts, said catalysts being useful in treating hydrocarbons in the presence of hydrogen. More particularly this invention relates to a novel process for preparing supported nickel-tungsten and nickel-tungsten-fluorine catalysts of increased surface area and superior hydrogenation activity.

It has long been recognized that catalysts suitable for the hydrogenation of hydrocarbons must have high activity in order to be commercially useful. It has also been recognized that the activity of these hydrogenation catalysts is in part related to the surface area of the catalyst. As a result of using the conventional processes for producing these hydrogenation catalysts, the surface area of the resulting catalyst is, in general, significantly less than the initial surface area of the support with a resulting significant reduction in the potential activity of the catalyst. When the supported nickel-tungsten hydrogenation catalysts including those that are fluorine promoted are made by conventional preparative techniques, the surface area of the resulting catalyst is, as expected, significantly lower than the surface area of the fresh support and consequently is less active than desired.

We have discovered a novel procedure for making these supported nickel-tungsten catalysts which results in a finished catalyst having a hydrogenation activity significantly higher than the comparable nickel-tungsten catalysts made by currently recommended procedures. The surface area of a catalyst made according to our procedure unexpectedly is significantly greater than the surface area of the otherwise identical catalyst made by conventional procedures and we attribute the increase in the catalytic activity to result, in part, from this increase in surface area.

In our procedure for making these catalysts, the nickel is associated with the support surface in an unknown manner. However, it is known that the metal must be reacted or strongly adsorbed to the support surface since substantial amounts of the metal remain on the support after it is thoroughly washed. After calcination of the support containing only the nickel retained after washing, no X-ray diffraction pattern is produced. X-ray diffraction analysis of a conventionally prepared nickel catalyst produces a positive diffraction pattern indicating a definite crystalline structure and suggesting that the nickel in our catalyst is more highly dispersed. We attribute the increased activity of our catalyst to result, in part, from these differences.

Our novel procedure for preparing these more active nickel-tungsten catalysts involves a preferred sequence of steps which is necessary to obtain the maximum advantages. First, the porous support material is impregnated with tungsten. The tungsten impregnation step can be accomplished in any convenient manner—a well-known method such as impregnation with ammonium metatungstate is satisfactory. We do not fully understand why it is advantageous to add the tungsten first, but we have established that this sequence of addition is necessary for best activity. To illustrate this, catalytically cracked furnace oil was converted to gasoline, under identical test conditions, resulting in a conversion of 58 percent when nickel was added before the tungsten component and a conversion of 78 percent when nickel was added after the tungsten both made in accordance with our invention. After the tungsten is impregnated onto the support, the impregnated support should be calcined to fix the tungsten on the support and prevent it from being washed off in the subsequent steps.

The tungsten-containing support is then contacted or impregnated with a nickel salt. Variables that may be adjusted to control the quality of nickel remaining on the support after washing are: nickel ion concentration in the solution, temperature of the nickel salt solution, and the length of time that the solution remains in contact with the support. The support is permitted to react with the nickel salt solution for a sufficient time to permit a predetermined quantity of nickel to deposit on the support. Following this treatment, excess nickel is washed from the support. The material is then dried and calcined in a conventional manner. When the catalyst is prepared in this manner, its surface area is significantly higher than the otherwise identical catalyst prepared by conventional techniques. This is indeed surprising and a satisfactory explanation is not available.

The activity of the composite is further increased by the addition of fluorine which can be incorporated at any convenient time during the preparation sequence. However, since it is possible to wash fluorine from the support, it is preferred to add the fluorine after the nickel has been incorporated to avoid any such washing loss. The fluorine can be incorporated by any convenient manner such as impregnation with HF or $NH_4F$ to produce the desired level of fluorine content.

The porous support material utilized in accordance with the teachings of the present invention may be prepared in any convenient manner or commercially available supports may be used. Preparation of a support normally involves formation of a hydroxide, drying of the hydroxide to remove excess water and finally calcination of the hydroxide to the oxide. The support may contain one or more of the oxides from Group II and Group IV of the Periodic Table, for example magnesia, boria, alumina, silica, silica-alumina, titania, silica-magnesia, etc. The support can be formed into particles of a suitable size and shape at any convenient point in the preparation. Forms such as beads, extrusions, powders, or microspheres may be chosen as dictated by processing conditions and other factors involved.

Particular supports which are satisfactory contain, for example, between 0 and 99 percent by weight silica and more preferably between 0 and 95 percent by weight silica with the balance in each case comprising alumina. Other suitable supports are those consisting of alumina or those in which alumina is present in an amount of from 1 to 99 percent by weight with two or more components such as silica and magnesia comprising the balance.

Tungsten can be added to the support in the form of any water-soluble compound of tungsten, in which the tungsten is present in the anion. We prefer to employ ammonium salts of tungstic acid and particularly ammonium metatungstate, ammonium tungstate or ammonia silica-dodecatungstate. The tungsten should be present in the finished catalyst in amounts between about 1 and 50 percent by weight and preferably between about 5 and 30 percent by weight. As pointed out above, it is preferred that the tungsten is added followed by calcination before the nickel is contacted with the support. The calcination temperature should be about 800° to 1,000° F. and for about 1 to 4 hours.

Physical contact of the nickel salt with the calcined support may be accomplished by slurrying together the salt and the support in a suitable container such as a beaker, contact vessel, etc. Another method that we have developed is a method we have termed "trickling." The trickle technique involves passing the metal salt solution over a static bed of support, maintaining a constant level of solution above the support, and allowing the solution to trickle through the support bed. The constant liquid level and a constant flow is maintained by pumping the solution, after contact with the support, to a reserve liquid container from which the liquid can be recycled to again contact the support.

The nickel salt solution, that is suitable for use in this invention, can be prepared in any desired manner and may be in the form of inorganic salts such as the nitrate, sulfate, chloride, and the like or salts of organic acids such as the acetate, formate, propionate and the like. We have found that nickel acetate is a particularly satisfactory salt. The metal ion concentration of the salt solution is one factor in determining the amount of nickel present in the finished catalyst. We have found it convenient to employ a nickel acetate solution containing the equivalent of about 4.5 to about 7.5 percent nickel oxide.

The temperature of the nickel salt solution also has an influence on the amount of metal retained on the support, higher temperatures tend to increase retention of the metal and lower temperatures tend to decrease retention. Decomposition of the salt will take place when the temperature is too high. We have found that in general temperatures ranging from slightly above the freezing point of the solution to the boiling point of the solution may be employed, the boiling point of the solution being taken at the pressure of the system. In particular, temperature ranges of about 25° to 70° C. are satisfactory and preferably 40° to 60° C.

Still another variable to consider in determining the amount of metal retained on the support is the time of contact between the support and the solution. Longer contact times promote retention and this variable is only limited by economics of manufacture. Contact times ranging from about one-fourth to 4 hours are generally satisfactory.

The wash liquid used for washing the unassociated nickel metal from the support should be free of ions other than those already present on the catalyst. Deionized water is a preferred wash liquid. Other satisfactory wash liquids are ammonium fluoride, hydrofluoric acid, ethyl alcohol, etc., and combinations thereof. When water is used for the wash solution, the washing is terminated when the conductivity of the wash effluent approaches that of distilled water. Suitable temperature ranges for the washing operation may be from 40° F. to the boiling point of the solution used at the pressure employed.

After the support is washed free of unassociated nickel, it can be dried and calcined or simply dried if fluorine addition is desired. Drying temperatures of 200° to 300° F. are satisfactory. Fluorine impregnation may be accomplished in any convenient manner. A preferred treating procedure involves soaking the support with aqueous HF to produce a fluorine content of about 1 to 3 percent by weight. However, these limits may be varied. Although aqueous HF is the preferred fluorine compound, other compounds thereof may be used. Examples of these are gaseous HF, $NH_4F$, $NH_4F \cdot HF$, $H_2SF_6$ and $HBF_4$.

After addition of the fluorine, when it is desired to incorporate fluorine into the finished catalyst, the composite is dried and preferably calcined. Suitable calcining temperatures range from about 800° to 1,200° F. and preferably 900° to 1,100° F. The catalyst may also be reduced in an atmosphere of hydrogen before use or sulfided in an atmosphere of hydrogen and hydrogen sulfide or treated in any other desired manner to enhance its utility in hydrogenation reactions.

EXAMPLE 1

In this example, a number of samples of six different catalyst formulation were prepared in order to compare catalysts made by our method of preparation with catalysts made in a conventional manner. The final metals content of each catalyst was approximately 6 percent nickel and approximately 19 to 25 percent tungsten on a commercially available silica-alumina containing about 25 percent alumina. Three catalyst formulations were promoted with approximately 1.5 percent fluorine and three were not fluorine promoted.

The first catalyst formulation was prepared by a conventional one-step impregnation procedure using a solution containing nickel nitrate, ammonium metatungstate and hydrogen fluoride followed by calcination at 1,000° F. for 10 hours. The second catalyst formulation was made in an identical manner except that nickel acetate was substituted for the nickel nitrate. The third catalyst formulation was made in accordance with our invention. The final three catalyst formulations were made in a manner identical with the first three respectively except that fluorine was omitted.

In a specific example of the third catalyst formulation, 151.3 grams of the silica alumina support was impregnated with 195 ml. of a water solution containing 54.1 grams of ammonium metatungstate. This was calcined at 1,000° F. for 10 hours. The calcined product was then treated at 55° C. with 350 ml. of 0.8 molar nickel acetate solution per 50 cc. of support at a contact rate of 20 ml. per minute for three-fourths hour using our trickle contact technique. The treated support was next thoroughly washed with deionized water at room temperature until the wash water exhibited a conductivity approaching distilled water. The washed material was then treated with a 1.2 molar hydrogen fluoride solution for 12 minutes and finally dried and calcined at 1,000° F. for 10 hours. The final calcined catalyst contained 5.8 weight percent nickel, 22 percent tungsten and 1.5 percent fluorine.

Table A compares the average final surface area of each of these six catalyst formulations as determined by standard BET method.

TABLE A

| Method of Preparation | Surface Area, m.²/g. | |
|---|---|---|
| | Without Fluorine | With Fluorine |
| 1. Impregnated nickel nitrate and ammonium metatungstate | 214 | 203 |
| 2. Impregnated nickel acetate and ammonium metatungstate | 247 | 217 |
| 3. Impregnated ammonium metatungstate then reacted with nickel acetate followed by washing | 318 | 237 |

EXAMPLE 2

The hydrogenation activity of the six catalyst formulations of example 1 were compared. The activity tests were run on a pretreated FCC furnace oil of 28.6 API at 1,000 p.s.i., 600° F., and LHSV=2.0. The catalysts were presulfided for 1 hour at atmospheric pressure and 600° F. with a blend of 92 percent hydrogen and 8 percent hydrogen sulfide.

The average results of the activity test on the six catalyst formulations are summarized in table B. Activity was measured as that percent of the original furnace oil which was converted to a fraction boiling below 400° F. in the 12-24 hour cut of the product.

TABLE B

| Method of Preparation | Percent Conversion of Furnace Oil | |
|---|---|---|
| | Without Fluorine | With Fluorine |
| 1. Impregnated nickel nitrate and ammonium metatungstate | 24 | 37 |
| 2. Impregnated nickel acetate and ammonium metatungstate | 25 | 39 |
| 3. Impregnated ammonium metatungstate reacted nickel acetate followed by washing | 30 | 78 |

EXAMPLE 3

This example demonstrates the difference in catalyst activity when nickel is added before the tungsten component and when nickel is added after the tungsten component.

The first catalyst was prepared by impregnating 47.25 grams of a commercially available silica alumina support material containing about 25 percent alumina with 50 ml. of a water solution containing 16.83 grams of ammonium metatungstate. This was calcined at 1,000° F. for 10 hours. The calcined product was then contacted at 55° C. with 750 ml. of 0.8 molar nickel acetate solution per 100 cc. of support at a contact rate of 20 ml. per minute using the trickle contact technique for three-fourths hour. The treated support was next thoroughly washed with deionized water at room temperature until the wash water exhibited a conductivity approaching that of distilled water. The washed material was then calcined at 1,000° F. for 10 hours and treated with a 0.7 molar hydrogen fluoride solution for 12 minutes and finally dried and calcined at 1,000° F. for 10 hours.

In the second catalyst preparation procedure, 45.3 grams of the commercial silica alumina was contacted with nickel acetate solution and washed in the same manner as described above, dried, calcined at 1,000° F. for 10 hours, and then impregnated with 44 ml. of a water solution containing 15.9 grams of ammonium metatungstate. The composite was dried, calcined at 1,000° F. for 10 hours, and then treated with a 0.7 molar hydrogen fluoride solution for 12 minutes and finally dried and calcined at 1,000° F. for 10 hours. The first and second catalysts were of comparable metals and fluorine contents.

The hydrogen activities of the two catalysts were compared by test runs with a pretreated FCC furnace oil of 28.6 API at 1,000 p.s.i., 600° F., and LHSV=2. The catalysts were each presulfided for one hour at atmospheric pressure and 600° F. with a blend of 92 percent hydrogen and 8 percent hydrogen sulfide.

The first catalyst prepared by adding tungsten before the nickel component demonstrated an activity of 78 percent conversion of the furnace oil compared to 58 percent conversion of the furnace oil for the second catalyst preparation, both activities being significantly superior to a similar nickel-tungsten catalyst of comparable metals and fluorine content and made by the conventional impregnation technique as set forth in example 1.

It is to be understood that the above disclosure is by way of specific example and that numerous modifications and variations are available to those of ordinary skill in the art without departing from the true spirit and scope of our invention.

We claim:

1. A method of preparing a supported nickel-tungsten hydrogenation catalyst in which the tungsten is separately incorporated onto the support by impregnation of the support with a water-soluble tungsten salt and calcination of the impregnated support, the improvement which comprises contacting the support with a solution of a nickel salt either before or after the tungsten is incorporated in the support, washing the support to remove a substantial amount of the nickel not bound to the support and calcining the washed support.

2. A method in accordance with claim 1 in which the tungsten is incorporated onto the support prior to the incorporation of the nickel onto the support.

3. A method in accordance with claim 1 in which the nickel is incorporated onto the support prior to the incorporation of the tungsten onto the support.

4. A method in accordance with claim 1 wherein the nickel salt is selected from the group consisting of nickel acetate and nickel formate.

5. A method in accordance with claim 1 wherein the nickel salt is nickel nitrate.

6. A method in accordance with claim 1 wherein the porous support material is a silica-alumina.

7. A method in accordance with claim 1 wherein fluorine is deposited on the composite.

8. A method in accordance with claim 6 wherein the nickel salt is nickel acetate.

9. A catalyst prepared in accordance with the method of claim 7.

10. A catalyst prepared in accordance with the method of claim 1.

* * * * *